(12) United States Patent
Nelkenbaum et al.

(10) Patent No.: US 9,107,042 B2
(45) Date of Patent: Aug. 11, 2015

(54) SYSTEM AND METHOD FOR JOINT PASSIVE INTERCEPTION OF SATELLITE AND CELLULAR COMMUNICATION

(75) Inventors: Yossi Nelkenbaum, Ramat-Gan (IL); Li-on Raviv, Petah-Tikva (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 246 days.

(21) Appl. No.: 13/474,761

(22) Filed: May 18, 2012

(65) Prior Publication Data

US 2012/0295615 A1    Nov. 22, 2012

(51) Int. Cl.
*H04W 4/02* (2009.01)

(52) U.S. Cl.
CPC ..................... *H04W 4/028* (2013.01)

(58) Field of Classification Search
CPC .............................. H04W 24/00; H04W 4/028
USPC .................................................. 455/414, 427
See application file for complete search history.

(56) References Cited

U.S. PATENT DOCUMENTS

| 6,134,437 A * | 10/2000 | Karabinis et al. ............. 455/427 |
| 2009/0238087 A1 * | 9/2009 | Shikowitz et al. ............. 370/252 |

FOREIGN PATENT DOCUMENTS

WO    2010116292 A2    10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

Asokan, N., et al., "Man-in-the-Middle in Tunneled Authentication Protocols," Draft version 1.3 (latest public version: http://eprint.iacr.org/2002/163/, Nov. 11, 2002, 15 pages.

Vedaldi, Andrea, "An implementation of SIFT detector and descriptor," University of California at Los Angeles, 7 pages.

Girardin, Fabien, et al., "Detecting air travel to survey passengers on a worldwide scale," Journal of Location Based Services, 26 pages.

Meyer, Ulrike, et al., "On the Impact of GSM Encryption and Man-in-the-Middle Attacks on the Security of Interoperating GSM/UMTS Networks," IEEE, 2004, 8 pages.

* cited by examiner

*Primary Examiner* — Dinh P Nguyen
(74) *Attorney, Agent, or Firm* — Meunier Carlin & Curfman

(57) ABSTRACT

Methods and systems for communication interception that apply joint processing to signals and information obtained from a satellite communication network and from a cellular communication network. A processing unit processes intercepted signals from the satellite and cellular networks using shared hardware. The processing unit extracts information related to target users from communication sessions conducted by the target users in the satellite and cellular networks. The processing unit may store this information in a single data structure, and in particular correlate information pertaining to the same target user in the two networks. The processing unit may correlate the different identifiers used by the target user in the different networks, and use this correlation to enhance the tracking of this user.

12 Claims, 1 Drawing Sheet

SYSTEM AND METHOD FOR JOINT PASSIVE INTERCEPTION OF SATELLITE AND CELLULAR COMMUNICATION

FIELD OF THE DISCLOSURE

The present disclosure relates generally to communication interception, and particularly to methods and systems for joint interception of satellite and cellular communication.

BACKGROUND OF THE DISCLOSURE

Communication interception is used in a variety of applications, such as for intelligence and surveillance, tracking locations of communication terminal users, or communication monitoring in restricted environments such as prisons.

SUMMARY OF THE DISCLOSURE

An embodiment that is described herein provides an apparatus including first and second front end receivers and a processing unit. The first front end receiver is configured to intercept first signals carrying one or more satellite communication sessions conducted in a satellite communication network. The second front end receiver is configured to intercept second signals carrying one or more cellular communication sessions conducted in a cellular communication network. The processing unit is configured to jointly process the intercepted first and second signals so as to track at least one target user in the satellite and cellular communication networks.

In some embodiments, the processing unit is configured to jointly process first information, which relates to a given target user and is received from the satellite communication network, and second information, which relates to the given target user and is received from the cellular communication network, so as to track the given target user in both the satellite and cellular communication networks.

In an embodiment, the processing unit includes at least one hardware processing module that is shared between processing of the first signals and the processing of the second signals. The at least one hardware module may include a Software Defined Radio (SDR) module that is configurable to process either the first signals or the second signals at any given time. Additionally or alternatively, the at least one hardware module may include deciphering hardware that is configurable to decrypt encrypted information conveyed by either the first signals or the second signals.

In a disclosed embodiment, the processing unit is configured to store information relating to both the satellite communication sessions and the cellular communication sessions in a single data structure. In an embodiment, the processing unit is configured to record in the single data structure media content of both the satellite communication sessions and the cellular communication sessions. In an example embodiment, the processing unit is configured to extract a first identifier of a given target user from the satellite communication sessions, to extract a second identifier of the given target user from the cellular communication sessions, and to store an association between the first and second identifiers in the single data structure.

In some embodiments, the processing unit is configured to present to an operator a joint Man Machine Interface (MMI) including first information, which relates to a given target user and is received from the satellite communication network, and second information, which relates to the given target user and is received from the cellular communication network.

There is additionally provided, in accordance with an embodiment that is described herein, a method including intercepting first signals carrying one or more satellite communication sessions conducted in a satellite communication network, and second signals carrying one or more cellular communication sessions conducted in a cellular communication network. At least one target user in the satellite and cellular communication networks is tracked by jointly processing the intercepted first and second signals.

The present disclosure will be more fully understood from the following detailed description of the embodiments thereof, taken together with the drawings in which:

DETAILED DESCRIPTION OF EMBODIMENTS

Overview

Individuals who are potential targets for surveillance may communicate over cellular communication networks, satellite communication networks, or both. In some cases, target users operate multi-mode communication terminals that are capable of both cellular and satellite communication. Embodiments that are described herein provide improved methods and systems for communication interception, which are particularly (though not exclusively) effective in dealing with such users. The disclosed techniques apply joint processing to signals and information obtained from a satellite communication network and from a cellular communication network. The products of this joint processing are then used for tracking target users in either network or in both.

Joint processing can be applied in various ways and at various stages of the interception and analysis process. In some disclosed embodiments, a processing unit processes intercepted signals from the satellite and cellular networks using shared hardware. For example, the processing unit may comprise Software Defined Radio (SDR) modules that are configurable to process either satellite signals or cellular signals. As another example, shared decryption hardware can be used to decipher encrypted data conveyed by the satellite and cellular signals. Using shared hardware reduces system cost and size, and enables efficient and flexible allocation of processing resources.

In other embodiments, the processing unit extracts information related to target users from communication sessions conducted by the target users in the satellite and cellular networks. The processing unit may store this information in a single data structure, and in particular correlate information pertaining to the same target user in the two networks. This sort of correlation provides an operator (e.g., analyst) with a unified view of a target user, and therefore enhances surveillance quality. In an example embodiment, a target user is identified by different identifiers (e.g., phone numbers, International Mobile Equipment Identities—IMEI and/or International Mobile Subscriber Identities—IMSI) in the satellite and cellular networks. The processing unit may correlate the different identifiers used by the target user in the different networks, and use this correlation to enhance the tracking of this user.

Other forms of joint processing may comprise, for example, joint indexing of data that is obtained from the two networks, or presenting a Man-Machine Interface (MMI) that displays information relating to a target user that is obtained from both networks.

System Description

Figure 1:
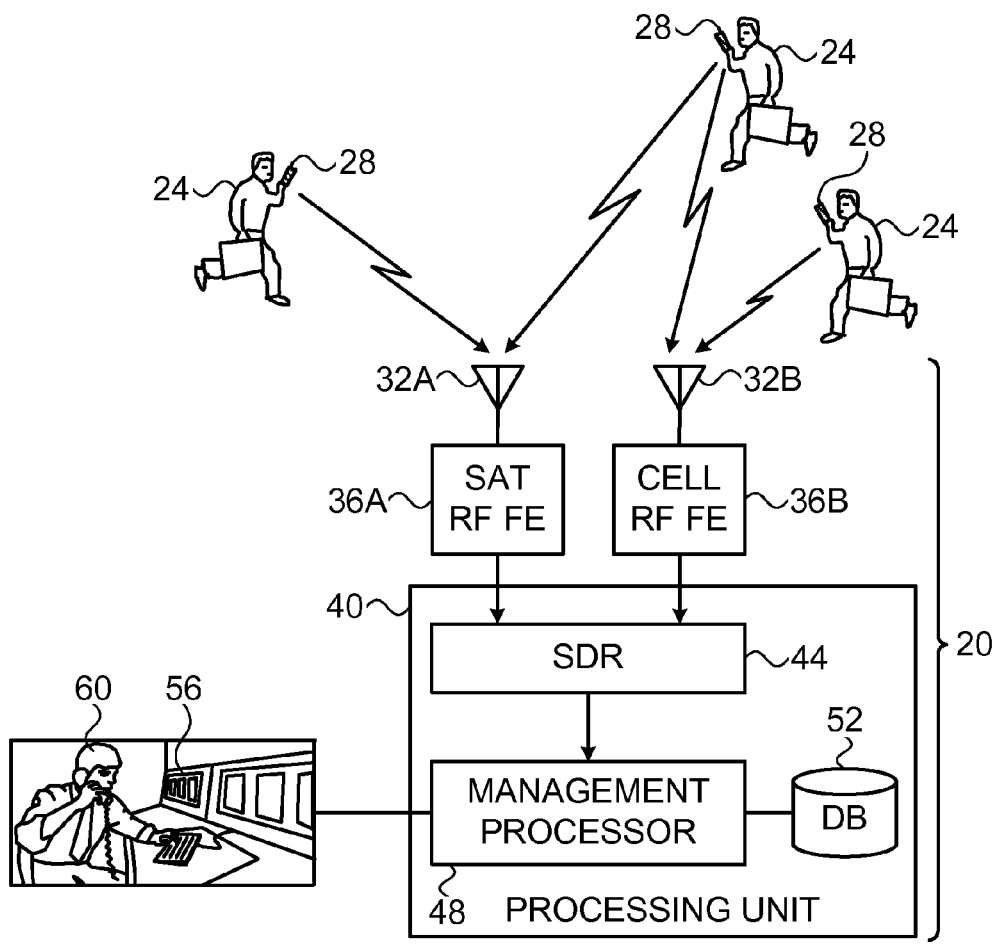
FIG. 1 is a block diagram that schematically illustrates a system for joint interception of satellite and cellular communication, in accordance with an embodiment that is described herein.

FIG. 1 is a block diagram that schematically illustrates a system 20 for joint interception of satellite and cellular communication, in accordance with an embodiment that is described herein. System 20 intercepts communication sessions that are conducted by users 24 who operate mobile communication terminals 28.

Some of terminals 28 comprise satellite terminals that communicate over a satellite communication network. Other terminals 28 comprise cellular terminals that communicate over a cellular communication network. In some cases, a given terminal 28 comprises a dual- or multi-mode terminal that is capable of communicating over both satellite and cellular communication networks. System 20 applies joint processing to signals and data that is obtained from both types of networks, using methods and configurations that are described in detail below. Systems of this sort may be used, for example, by government and law enforcement agencies for intelligence gathering and surveillance, for monitoring communication in restricted environments such as prisons, or in any other suitable application.

System 20 may intercept communication sessions from any suitable number of satellite and cellular communication networks. Satellite networks may comprise, for example, the Inmarsat, Iridium, Thuraya or Globalstar networks, or any other suitable satellite network. Cellular networks may comprise, for example, Global System for Mobile communications (GSM), Universal Mobile Telecommunications Service (UMTS) or any other suitable cellular network.

Terminals 28 may comprise, for example, handheld cellular and/or satellite phones, Very Small Aperture Terminals (VSAT), mobile computing devices equipped with cellular and/or satellite modems, or any other suitable type of device capable of satellite and/or cellular communication. The communication sessions intercepted by system 20 may involve transfer of voice, data, images or any other suitable media type.

System 20 is typically used for tracking target users, e.g., users 24 who are suspected of being involved in illegitimate activities or users who are of interest for any other reason. Nevertheless, in some applications system 20 can be used for indiscriminate tracking of users, e.g., users located in a certain geographical area. In this context, any user 24 who is tracked by the system can be referred to as a target user. System 20 is typically passive, i.e., intercepts communication sessions by reception only without transmitting over the intercepted networks. Alternatively, however, active interception in the satellite and/or cellular network can also be used.

In the example of FIG. 1, system 20 receives signals from the satellite network using a satellite antenna 32A that is connected to a satellite Radio Frequency (RF) Front End (FE) 36A. RF FE 36A receives uplink and/or downlink satellite signals, i.e., from a satellite and/or from satellite terminals. System 20 receives signals from the cellular network using a cellular antenna 32B that is connected to a cellular RF FE 36B. RF FE 36B receives uplink and/or downlink cellular signals, i.e., from base stations and/or from cellular terminals.

RF FE 36A and 36B typically down-convert their respective received signals and may apply other types of processing such as filtering and amplification.

System 20 comprises a processing unit 40, which jointly processes the signals received by the satellite and cellular RF FE. In the example embodiment of FIG. 1, processing unit 40 comprises a Software Defined Radio (SDR) 44, a management processor 48 and a database (DB) 52. SDR 44 typically demodulates and decodes the received satellite and cellular signals so as to extract the content of the communication sessions. The management processor typically extracts information of interest from the communication sessions, associates information received from different sessions and/or from different networks, manages recording and storage of information, and manages the presentation of interception products, i.e., outputs of the interception process.

Information of interest that is extracted from intercepted sessions may comprise, for example, session content (e.g., voice, data or images), identifiers used by the users involved in the sessions (e.g., phone numbers, IMSI, IMEI or e-mail addresses), session attributes (e.g., time of day, session duration), or any other suitable type of information. In particular, management processor 48 may collect and associate information pertaining to target users from the intercepted sessions of the satellite and cellular networks. Database 52 is used for storing at least some of the information of interest that is extracted from communication sessions, as well as any other suitable information, such as lists of target users.

Management processor 48 presents the information of interest to an operator 60. In the present example, the information is presented using a suitable output device at a monitoring center 56 that is separate from system 20. Additionally or alternatively, information of interest can be presented to an operator using a suitable output device locally at system 20. The operator may control and configure system 20, either remotely from the monitoring center or locally, using suitable input devices.

The configuration of system 20 shown in FIG. 1 is an example configuration, which is shown purely for the sake of clarity. In alternative embodiments, any other suitable configuration can also be used. For example, the division of functions between SDR 44 and processor 48 can be defined in any other suitable manner. Generally, the structural and functional partitioning of processing unit into elements can be defined in any other suitable way.

Alternatively to using SDR, system 20 may comprise any other suitable type of modems or other processing elements. In some embodiments, at least some of the RF FE circuitry and/or antenna circuitry may be shared between the satellite and cellular networks. The elements of processing unit 40 may be implemented using hardware, e.g., using one or more Application-Specific Integrated Circuits (ASICs) or Field-Programmable Gate Arrays (FPGAs), using software, or using a combination of hardware and software elements. DB 52 may comprise any suitable type of storage device such as magnetic or solid state memory.

In some embodiments, processor 48 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Example Joint Processing Schemes

In various embodiments, processing unit 40 may apply various types of joint processing to the satellite and cellular signals and data. Joint processing may be carried out by any of the elements of the processing unit, at any stage of the interception and analysis flow.

In some embodiments, joint processing involves sharing certain processing hardware between processing of satellite signals and processing of cellular signals. Hardware sharing of this sort is often feasible, because the basic building blocks of demodulating and decoding a communication session are often similar for satellite and cellular communication sessions.

In an example embodiment, at least some of the hardware of SDR 44 is configurable to process satellite signals at a certain point in time, and cellular signals at a different point in time. For example, SDR 44 may comprise multiple SDR modules (not shown in the figure). Each SDR module is configurable to process either satellite signals received from RF FE 36A or cellular signals received from RF FE 36B. At any given time, SDR 44 is configured by processor 48 so that a desired number of SDR modules are assigned to process satellite signals, and a desired number of SDR modules are assigned to process cellular signals.

As another example, the shared hardware may comprise decryption hardware that is used for deciphering encrypted information conveyed by the satellite and cellular signals. In some cases, the satellite and cellular networks use similar encryption schemes. This similarity can be exploited by reusing the same deciphering hardware for decryption in both networks. For example, GSM networks typically use A5.1/A5.2 encryption, and Thuraya satellite systems use an encryption scheme that is very similar to A5.2. Decryption in both types of network can be carried out using the same hardware, with possibly some network-specific re-configuration.

In an example embodiment, the deciphering hardware comprises acceleration hardware that may be shared between the satellite and cellular signal processing. Such acceleration hardware may comprise, for example, FPGAs, General-Purpose Graphics Processing Units (GP-GPU, e.g., devices produced by NVIDIA Corp. (Santa Clara, Calif.)), or any other suitable hardware. In alternative embodiments, hardware sharing between processing of satellite and cellular signals can be carried out in any other suitable way.

In some embodiments, joint processing involves storing information of interest that is obtained from both the satellite network and the cellular network in a single data structure, typically in DB 52. In particular, the single data structure may hold information relating to a given target user, which was extracted from communication sessions held by that user in both the satellite network and the cellular network.

For example, a target user may be identified in the satellite network and the cellular network using different identifiers (e.g., IMSI, IMEI, phone numbers, e-mail addresses or any other suitable identifier). Processor 48 may correlate between the different identifiers, and store the identifiers and the association between them in a single data structure. Correlation of identifiers can be highly effective in correlating communication sessions, which are held in the satellite and cellular networks by the same user.

By associating sessions of the same user in the different networks, information of interest in the satellite and cellular networks that relate to the same user can be jointly indexed, browsed, searched, presented or otherwise analyzed efficiently. This kind of joint processing over the satellite and cellular networks provides analytics information that is not achievable by separate processing for each network.

Processor 48 may correlate different identifiers of a given target user using any suitable method. Example identifier association techniques are addressed, for example, in U.S. Pat. No. 7,882,217 and is U.S. patent application Ser. Nos. 12/888,445 and 12/964,891, whose disclosures are incorporated herein by reference.

In an example embodiment, processor 48 may record media content (e.g., voice, data or images) of a target user, which was received from both the satellite network and the cellular network, in a single data structure. The media content of a given target user from the satellite network and the cellular network can then be jointly indexed, browsed, searched, presented or otherwise analyzed. Similar joint processing can be applied to any other suitable kind of information relating to a given target user, some of which was obtained from the satellite network and some from the cellular network.

Joint processing of this sort is effective, for example, for tracking target users who use multi-mode terminals for communicating over the satellite and cellular networks. Nevertheless, the disclosed techniques can similarly be used for tracking target users who communicate over the satellite and cellular networks using different terminals.

As yet another example, joint processing may involve providing operator 60 with a unified Man Machine Interface (MMI), which presents information that relates to a given target user and was obtained from sessions of that user in both the satellite network and the cellular network. Such information may comprise, for example, correlated e-mail addresses of the target user, a speech signature (sometimes referred to as voiceprint) of the speaker, or any other suitable information.

In alternative embodiments, processing unit 40 may apply any other suitable kind of joint processing to the signals received from the satellite and cellular networks, so as to enable efficient tracking of target users across any or both networks.

Joint Interception Method Description

Figure 2:
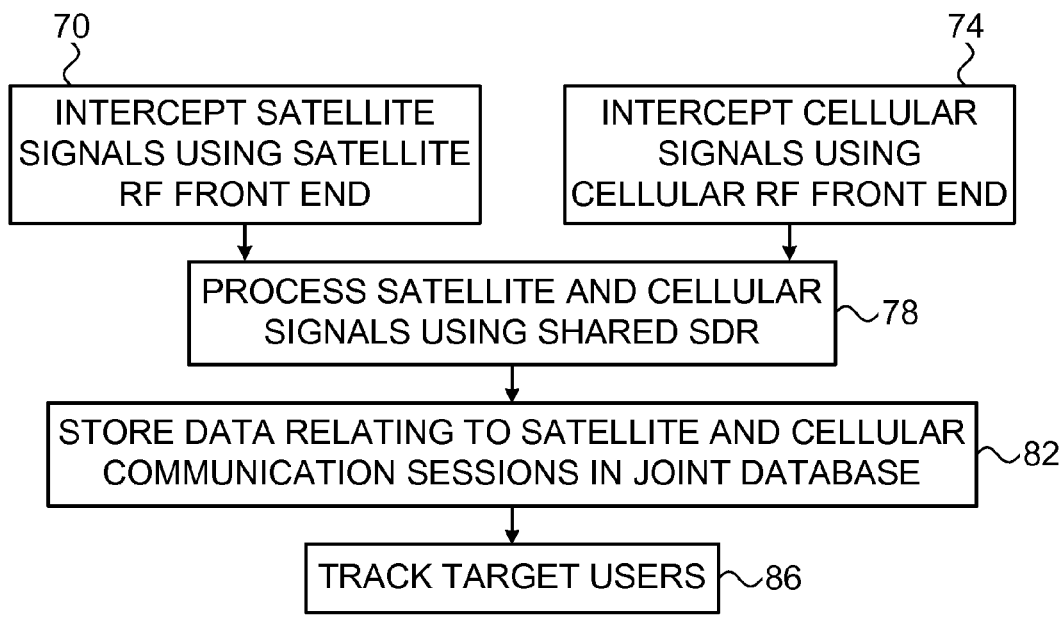
FIG. 2 is a block diagram that schematically illustrates a system for joint interception of satellite and cellular communication, in accordance with an embodiment that is described herein.

FIG. 2 is a block diagram that schematically illustrates a system for joint interception of satellite and cellular communication, in accordance with an embodiment that is described herein. The method begins with satellite RF FE 36A intercepting satellite signals from the satellite communication network, at a satellite interception step 70. Cellular RF FE 36B intercepts cellular signals from the cellular communication network, at a cellular interception step 74. Processing unit 40 jointly processes the signals received from the satellite and cellular networks.

In some embodiments, SDR 44 demodulates and decodes communication sessions in the satellite and cellular network, such that SDR resources are shared between processing of satellite signals and processing of cellular signals, at a shared decoding step 78. In some embodiments, shared deciphering hardware decrypts encrypted information conveyed in the communication sessions of both networks, as explained above. In some embodiments, management processor 48 jointly stores information of interest from the two networks in DB 52, at a joint storage step 82. Processor 48 may apply various types of joint management and analysis to the information of interest, as explained above.

The information of interest obtained by processor 48 is output to monitoring center 56 for presenting to operator 60. System 20 thus enables efficient tracking of target users, at a tracking step 86, using the joint processing of signals from the satellite and cellular networks.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
a first front end receiver, which is configured to intercept first signals carrying one or more satellite communication sessions conducted in a satellite communication network;
a second front end receiver, which is configured to intercept second signals carrying one or more cellular communication sessions conducted in a cellular communication network;
a structured database; and
a processing unit, which is configured to jointly process the intercepted first and second signals so as to track at least one target user in both the satellite and cellular communication networks,
wherein the joint processing comprises extracting a first identifier of a given target user found within the satellite communication sessions, extracting a second identifier of the given target user found within the cellular communication sessions, correlating the first identifier and the second identifier, and storing the first and second identifiers and the correlation between them to a single data structure of the structured database.

2. The apparatus according to claim 1, wherein the processing unit comprises at least one hardware processing module that is shared between processing of the first signals and the processing of the second signals.

3. The apparatus according to claim 2, wherein the at least one hardware module comprises a Software Defined Radio (SDR) module that is configurable to process either the first signals or the second signals at any given time.

4. The apparatus according to claim 2, wherein the at least one hardware module comprises deciphering hardware that is configurable to decrypt encrypted information conveyed by either the first signals or the second signals.

5. The apparatus according to claim 1, wherein the processing unit is configured to record in the single data structure media content of both the satellite communication sessions and the cellular communication sessions.

6. The apparatus according to claim 1, wherein the processing unit is configured to present to an operator of a joint Man Machine Interface (MMI) the first and second identifiers and the correlation.

7. A method, comprising:
intercepting first signals carrying one or more satellite communication sessions conducted in a satellite communication network;
intercepting second signals carrying one or more cellular communication sessions conducted in a cellular communication network; and
tracking at least one target user in both the satellite and cellular communication networks by jointly processing the intercepted first and second signals, wherein the joint processing comprises extracting a first identifier of a given target user found within the satellite communication sessions, extracting a second identifier of the given target user found within the cellular communication sessions, correlating the first identifier and the second identifier, and storing the first and second identifiers and the correlation to a single data structure of a structured database.

8. The method according to claim 7, wherein jointly processing the intercepted signals comprises sharing at least one hardware processing module between processing of the first signals and the processing of the second signals.

9. The method according to claim 8, wherein sharing the at least one hardware processing module comprises operating a Software Defined Radio (SDR) module that is configurable to process either the first signals or the second signals at any given time.

10. The method according to claim 8, wherein sharing the at least one hardware processing module comprises operating deciphering hardware that is configurable to decrypt encrypted information conveyed by either the first signals or the second signals.

11. The method according to claim 7, wherein jointly processing the intercepted signals further comprises recording in the single data structure media content of both the satellite communication sessions and the cellular communication sessions.

12. The method according to claim 7, wherein jointly processing the intercepted signals further comprises presenting to an operator of a joint Man Machine Interface (MMI), the first and second identifiers and the correlation.

* * * * *